(12) United States Patent
Fujishiro et al.

(10) Patent No.: US 12,426,116 B2
(45) Date of Patent: Sep. 23, 2025

(54) COMMUNICATION CONTROL METHOD

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 393 days.

(21) Appl. No.: 18/056,674

(22) Filed: Nov. 17, 2022

(65) Prior Publication Data

US 2023/0078657 A1 Mar. 16, 2023

Related U.S. Application Data

(63) Continuation of application No. PCT/JP2021/018425, filed on May 14, 2021.

(60) Provisional application No. 63/026,246, filed on May 18, 2020.

(51) Int. Cl.
*H04W 76/18* (2018.01)
*H04W 76/19* (2018.01)

(52) U.S. Cl.
CPC ............ *H04W 76/18* (2018.02); *H04W 76/19* (2018.02)

(58) Field of Classification Search
CPC ................. H04W 76/18; H04W 76/19
See application file for complete search history.

(56) References Cited

U.S. PATENT DOCUMENTS

2022/0217598 A1* 7/2022 Ishii .................. H04W 36/0058
2022/0394807 A1* 12/2022 Xu ......................... H04W 76/14
2023/0124364 A1* 4/2023 Hwang .................. H04W 76/18
370/216

OTHER PUBLICATIONS

Sharp; "Issue of loop topology after RLF"; 3GPP TSG-RAN WG2 Meeting #108; R2-1915766; Nov. 18-22, 2019; Total 3 pages; Reno, NV, U.S.A.
Huawei, Hisilicon; "Summary of [AT109bis-e][024] 3X.304 CRs and IAB supporting in NPN"; 3GPP TSG-RAN WG2 Meeting #109bis electronic; R2-2004154; Apr. 20-30, 2020; Total 10 pages.
Kyocera; "Consideration of topology adaptation in IAB"; 3GPP TSG-RAN WG3 #101; R3-184775; Aug. 20-24, 2018; Total 5 pages; Gothenburg, Sweden.

* cited by examiner

*Primary Examiner* — Derrick V Rose
(74) *Attorney, Agent, or Firm* — Studebaker Brackett PLLC

(57) ABSTRACT

A communication control method includes broadcasting, by a first relay node configured to manage a cell, relay node support information indicating that the cell supports the relay node, communicating, by the first relay node, a failure-related notification indicating that a failure has occurred in a backhaul link, and stopping, by the first relay node, the broadcasting of the relay node support information according to the communication of the failure-related notification.

5 Claims, 15 Drawing Sheets

COMMUNICATION CONTROL METHOD

RELATED APPLICATIONS

The present application is a continuation based on PCT Application No. PCT/JP2021/018425, filed on May 14, 2021, which claims the benefit of U.S. Provisional Application No. 63/026,246 filed on May 18, 2020. The content of which is incorporated by reference herein in their entirety.

TECHNICAL FIELD

The present disclosure relates to a communication control method used in a cellular communication system.

BACKGROUND OF INVENTION

The 3rd Generation Partnership Project (3GPP), which is a standardization project of a cellular communication system, has been studying introduction of a new relay node referred to as an Integrated Access and Backhaul (IAB) node. One or more relay nodes are involved in communication between a base station and user equipment, and perform relay for the communication.

SUMMARY

In a first aspect, a communication control method includes broadcasting, by a first relay node configured to manage a cell, relay node support information indicating that the cell supports a relay node, communicating, by the first relay node, a failure-related notification indicating that a failure has occurred in a backhaul link, and stopping, by the first relay node, the broadcasting of the relay node support information according to the communication of the failure-related notification.

In a second aspect, a communication control method includes excluding, by a relay node, a cell not broadcasting relay node support information indicating that the relay node is supported, from candidate cells in which the relay node is to exist, and even during an exclusion request period in which continuation of the exclusion is requested, selecting, by the relay node, the cell as the candidate cell when the broadcasting of the relay node support information from the cell has been confirmed.

In a third aspect, a communication control method includes broadcasting, from a cell of a relay node belonging to a relay node topology, a topology number identifying the relay node topology, wherein the relay node topology is a topology including one or more relay nodes managed by one donor node.

DESCRIPTION OF EMBODIMENTS

A cellular communication system according to an embodiment will be described with reference to the drawings. In the description of the drawings, the same or similar parts are denoted by the same or similar reference signs.

Configuration of Cellular Communication System

Figure 1:
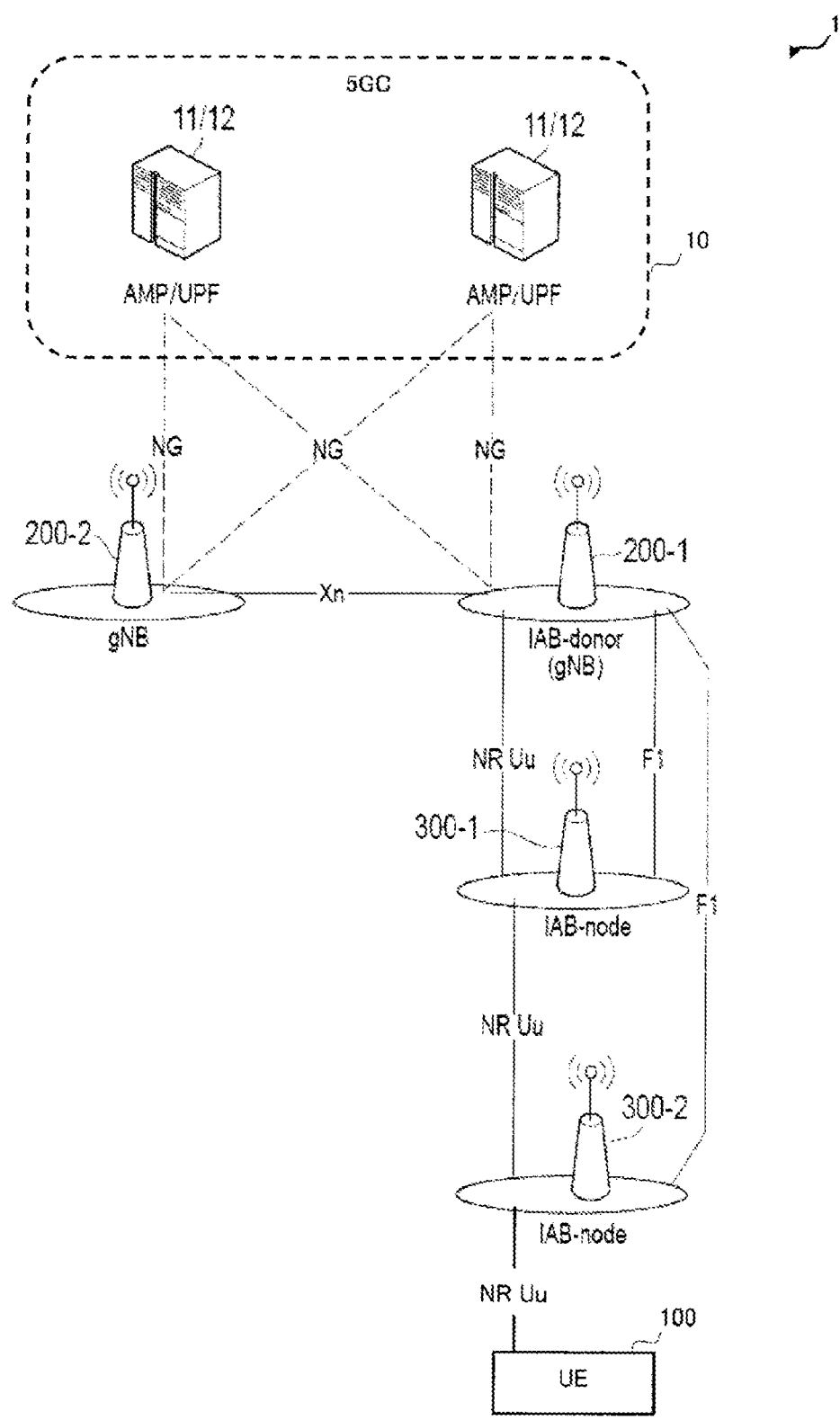
FIG. 1 is a diagram illustrating a configuration of a cellular communication system according to an embodiment.

First, a configuration of the cellular communication system according to an embodiment will be described. FIG. 1 is a diagram illustrating a configuration of a cellular communication system 1 according to an embodiment.

The cellular communication system 1 is a fifth generation (5G) cellular communication system based on the 3GPP standard. Specifically, a radio access scheme in the cellular communication system 1 is New Radio (NR) being a radio access scheme of the 5G. Note that Long Term Evolution (LTE) may be at least partially applied to the cellular communication system 1.

As illustrated in FIG. 1, the cellular communication system 1 includes a 5G core network (5GC) 10, user equipment (UE) 100, a base station (referred to as a gNB) 200, and an IAB node 300. The IAB node 300 is an example of a relay node.

An example in which the base station is an NR base station will be mainly described below. However, the base station may be an LTE base station (i.e., an eNB).

The 5GC 10 includes an Access and Mobility Management Function (AMF) 11 and a User Plane Function (UPF) 12. The AMF 11 is an apparatus that performs various types of mobility controls and the like for the UE 100. By communicating with the UE 100 by using Non-Access Stratum (NAS) signaling, the AMF 11 manages information of an area in which the UE 100 exists. The UPF 12 is an apparatus that performs transfer control of user data and the like.

Each gNB 200 is a fixed wireless communication node and manages one or more cells. The term "cell" denotes a minimum unit of a wireless communication area. The term "cell" may denote a function or a resource for performing wireless communication with the UE 100. One cell belongs to one carrier frequency.

Each gNB 200 is mutually connected to the 5GC 10 via an interface referred to as an NG interface. FIG. 1 illustrates an example of two gNBs, a gNB 200-1 and a gNB 200-2 that are connected to the 5GC 10.

Each gNB 200 is interconnected to another neighboring gNB 200 via an inter-base station interface referred to as an Xn interface. FIG. 1 illustrates an example in which the gNB 200-1 is connected to the gNB 200-2.

Each gNB 200 may be divided into a central unit (CU) and a distributed unit (DU). The CU and the DU are interconnected via an interface referred to as an F1 interface. The F1 protocol is a communication protocol between the CU and the DU, and includes an F1-C protocol corresponding to a protocol for a control plane and an F1-U protocol corresponding to a protocol for a user plane.

The cellular communication system 1 supports an IAB that uses NR for the backhaul to enable wireless relay of NR access. The donor gNB 200-1 is a gNB 200 corresponding to a terminal node of the NR backhaul on the network side and including additional functions that support the IAB. The backhaul is capable of multi-hop via a plurality of hops (i.e., a plurality of IAB nodes 300).

An example is illustrated in FIG. 1 in which an IAB node 300-1 is wirelessly connected to the donor gNB 200-1, an IAB node 300-2 is wirelessly connected to the IAB node 300-1, and the F1 protocol is transmitted via two backhaul hops.

The UE 100 is a mobile wireless communication apparatus that can perform wireless communication with cells. The UE 100 may be any type of apparatus as long as the UE 100 is an apparatus that performs wireless communication with the gNB 200 or the IAB node 300. For example, the UE 100 is a mobile phone terminal, a tablet terminal, a notebook PC, a sensor or an apparatus provided in the sensor, and/or a vehicle or an apparatus provided in the vehicle. The UE 100 is wirelessly connected to the IAB node 300 or the gNB 200 via an access link. FIG. 1 illustrates an example in which the UE 100 is wirelessly connected to the IAB node 300-2. The UE 100 indirectly communicates with the donor gNB 200-1 via the IAB node 300-2 and the IAB node 300-1.

Figure 2:
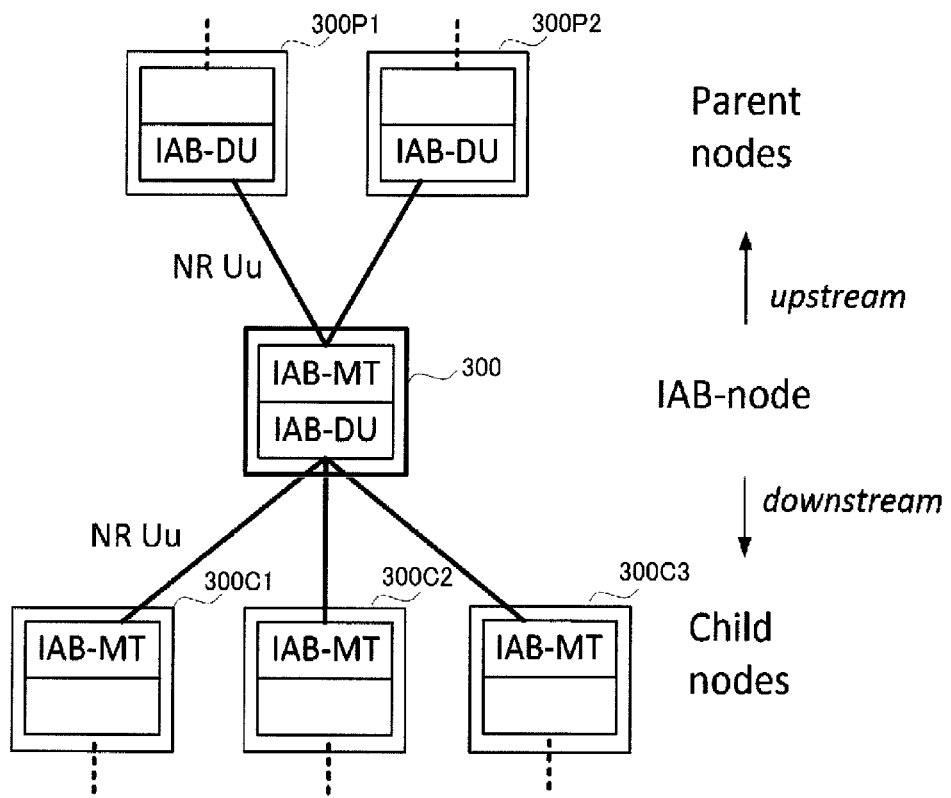
FIG. 2 is a diagram illustrating a relationship between an IAB node, parent nodes, and child nodes.

FIG. 2 is a diagram illustrating the relationship among the IAB node 300, the parent nodes, and the child nodes.

As illustrated in FIG. 2, each IAB node 300 includes an IAB-DU corresponding to a base station functioner and an IAB-Mobile Termination (MT) corresponding to a user equipment functioner.

Neighboring nodes on an NR Uu wireless interface of the IAB-MT (i.e., upper nodes) may be referred to as "parent nodes". The parent node is the DU of a parent IAB node or a donor gNB 200. A radio link between the IAB-MT and each parent node is referred to as a backhaul link (BH link). In FIG. 2, an example in which the parent nodes of the IAB node 300 are IAB nodes 300P1 and 300P2 is illustrated. Note that the direction toward the parent nodes is referred to as upstream.

Neighboring nodes on an NR access interface of the IAB-DU (i.e., lower nodes) may be referred to as "child nodes". The IAB-DU manages cells in a manner same as, and/or similar to the gNB 200. The IAB-DU terminates the NR Uu wireless interface to the UE 100 and the lower IAB nodes. The IAB-DU supports the F1 protocol for the CU of the donor gNB 200-1. In FIG. 2, an example in which the child nodes of the IAB node 300 are IAB nodes 300C1 to 300C3 is illustrated. Note that the direction toward the child nodes is referred to as downstream.

Configuration of Base Station

Figure 3:
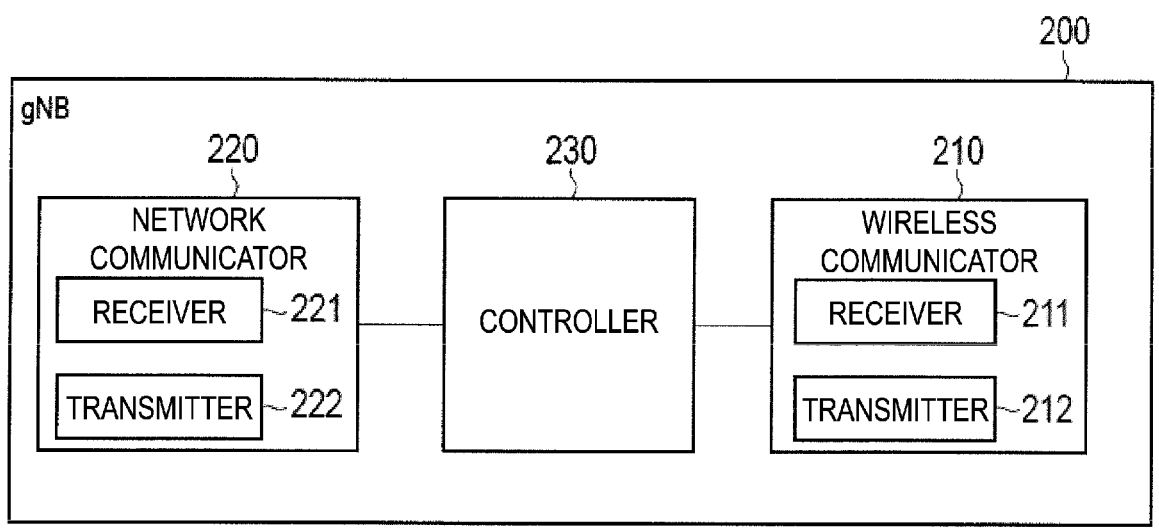
FIG. 3 is a diagram illustrating a configuration of a base station according to an embodiment.

A configuration of the gNB 200, corresponding to a base station according to an embodiment, will be described. FIG. 3 is a diagram illustrating a configuration of the gNB 200. As illustrated in FIG. 3, the gNB 200 includes a wireless communicator 210, a network communicator 220, and a controller 230.

The wireless communicator 210 performs wireless communication with the UE 100 and performs wireless communication with the IAB node 300. The wireless communicator 210 includes a receiver 211 and a transmitter 212. The receiver 211 performs various types of receptions under control of the controller 230. The receiver 211 includes an antenna, and converts a radio signal received by the antenna into a baseband signal (received signal) and outputs the baseband signal to the controller 230. The transmitter 212 performs various types of transmissions under control of the controller 230. The transmitter 212 includes an antenna, and converts a baseband signal (transmission signal) to be output by the controller 230 into a radio signal and transmits the radio signal from the antenna.

The network communicator 220 performs wired communication (or wireless communication) with the 5GC 10 and performs wired communication (or wireless communication) with another neighboring gNB 200. The network communicator 220 includes a receiver 221 and a transmitter 222. The receiver 221 performs various types of receptions under control of the controller 230. The receiver 221 receives a signal from the outside and outputs the received signal to the controller 230. The transmitter 222 performs various types of transmissions under control of the controller 230. The transmitter 222 transmits a transmission signal output by the controller 230 to the outside.

The controller 230 performs various types of controls for the gNB 200. The controller 230 includes at least one memory and at least one processor electrically connected to the memory. The memory stores programs to be executed by the processor and information to be used for processes by the processor. The processor may include a baseband processor and a Central Processing Unit (CPU). The baseband processor performs modulation and demodulation, and coding and decoding of a baseband signal, and the like. The CPU executes the programs stored in the memory to perform various types of processes. The processor performs processing of the layers described below.

Configuration of Relay Node

Figure 4:
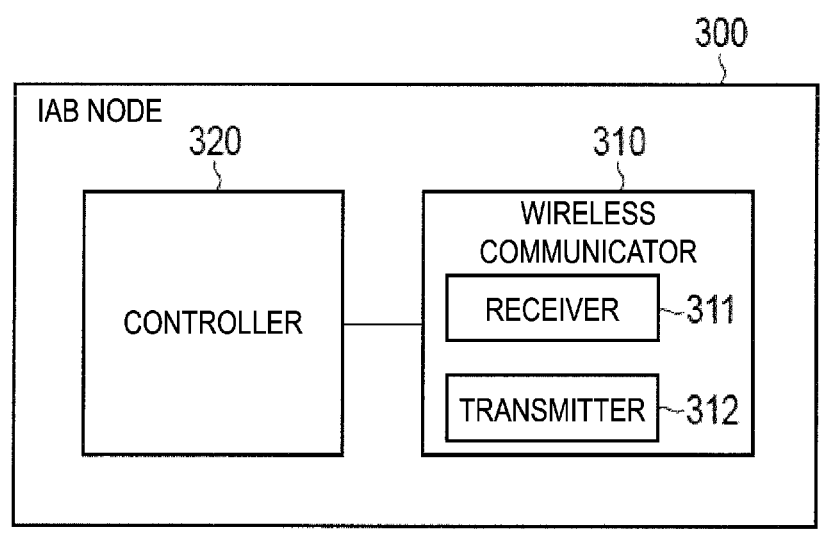
FIG. 4 is a diagram illustrating a configuration of a relay node according to an embodiment.

A configuration of the IAB node 300 that is a relay node according to an embodiment will be described. FIG. 4 is a diagram illustrating a configuration of the IAB node 300. As illustrated in FIG. 4, the IAB node 300 includes a wireless communicator 310 and a controller 320. The IAB node 300 may include a plurality of wireless communicators 310.

The wireless communicator 310 performs wireless communication (BH link) with the gNB 200 and performs wireless communication (access link) with the UE 100. The wireless communicator 310 for the BH link communication and the wireless communicator 310 for the access link communication may be provided separately.

The wireless communicator 310 includes a receiver 311 and a transmitter 312. The receiver 311 performs various types of receptions under control of the controller 320. The receiver 311 includes an antenna, and converts a radio signal received by the antenna into a baseband signal (received signal) and outputs the baseband signal to the controller 320. The transmitter 312 performs various types of transmissions under control of the controller 320. The transmitter 312 includes an antenna, and converts a baseband signal (transmission signal) to be output by the controller 320 into a radio signal and transmits the radio signal from the antenna.

The controller 320 performs various types of controls in the IAB node 300. The controller 320 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of User Equipment

Figure 5:
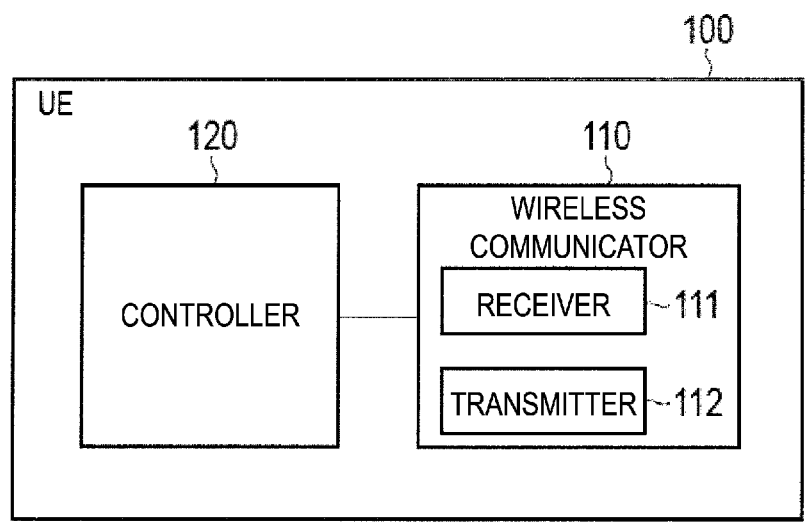
FIG. 5 is a diagram illustrating a configuration of user equipment according to an embodiment.

A configuration of the UE 100, corresponding to user equipment according to an embodiment, will be described. FIG. 5 is a diagram illustrating a configuration of the UE 100. As illustrated in FIG. 5, the UE 100 includes a wireless communicator 110 and a controller 120.

The wireless communicator 110 performs wireless communication in the access link, specifically, wireless communication with the gNB 200 and wireless communication with the IAB node 300. The wireless communicator 110 may perform wireless communication in the sidelink, that is, wireless communication with another UE 100. The wireless communicator 110 includes a receiver 111 and a transmitter 112. The receiver 111 performs various types of receptions under control of the controller 120. The receiver 111 includes an antenna, and converts a radio signal received by the antenna into a baseband signal (received signal) and outputs the baseband signal to the controller 120. The transmitter 112 performs various types of transmissions under control of the controller 120. The transmitter 112 includes an antenna, and converts a baseband signal (transmission signal) to be output by the controller 120 into a radio signal and transmits the radio signal from the antenna.

The controller 120 performs various types of controls for the UE 100. The controller 120 includes at least one memory and at least one processor electrically connected to the memory. The memory stores programs to be executed by the processor and information to be used for processes by the processor. The processor may include a baseband processor and a CPU. The baseband processor performs modulation and demodulation, and coding and decoding of a baseband signal, and the like. The CPU executes the programs stored in the memory to perform various types of processes. The processor performs processing of the layers described below.

Configuration of Protocol Stack

Figure 6:
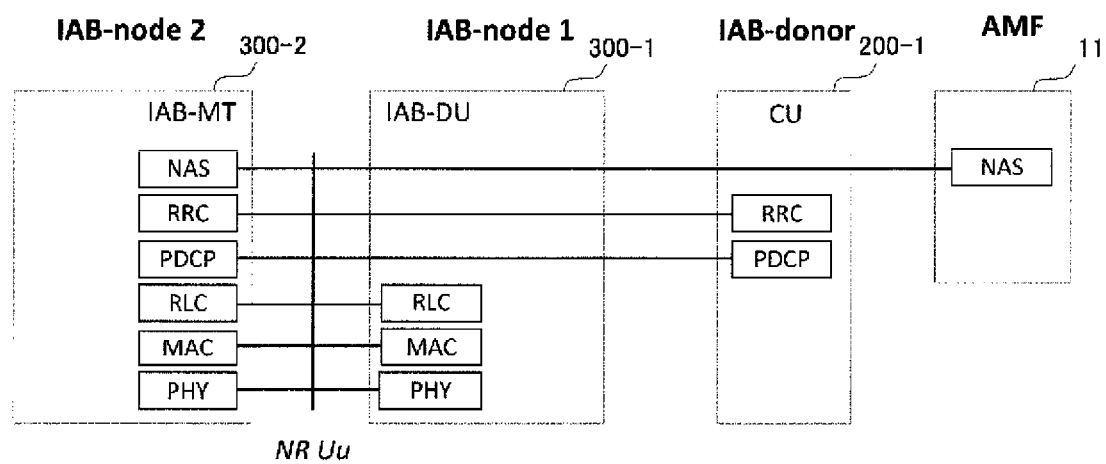
FIG. 6 is a diagram illustrating a protocol stack related to an RRC connection and an NAS connection of an IAB-MT.

A configuration of the protocol stack according to an embodiment will be described. FIG. 6 is a diagram illustrating an example of a protocol stack related to an RRC connection and an NAS connection of the IAB-MT.

As illustrated in FIG. 6, the IAB-MT of the IAB node 300-2 includes a physical (PHY) layer, a Medium Access Control (MAC) layer, a Radio Link Control (RLC) layer, a Packet Data Convergence Protocol (PDCP) layer, a Radio Resource Control (RRC) layer, and a Non-Access Stratum (NAS) layer.

The PHY layer performs coding and decoding, modulation and demodulation, antenna mapping and demapping, and resource mapping and demapping. Data and control information are transmitted between the PHY layer of the IAB-MT of the IAB node 300-2 and the PHY layer of the IAB-DU of the IAB node 300-1 via a physical channel.

The MAC layer performs priority control of data, a retransmission process through a hybrid ARQ (HARQ), a random access procedure, and the like. Data and control information are transmitted between the MAC layer of the IAB-MT of the IAB node 300-2 and the MAC layer of the IAB-DU of the IAB node 300-1 via a transport channel. The MAC layer of the IAB-DU includes a scheduler. The scheduler determines transport formats (transport block sizes, modulation and coding schemes (MCSs)) in the uplink and the downlink and resource blocks to be allocated.

The RLC layer transmits data to the RLC layer on the reception side by using functions of the MAC layer and the PHY layer. Data and control information are transmitted between the RLC layer of the IAB-MT of the IAB node 300-2 and the RLC layer of the IAB-DU of the IAB node 300-1 via a logical channel.

The PDCP layer performs header compression and decompression, and encryption and decryption. Data and control information are transmitted between the PDCP layer of the IAB-MT of the IAB node 300-2 and the PDCP layer of the donor gNB 200-1 via a radio bearer.

The RRC layer controls a logical channel, a transport channel, and a physical channel according to establishment, reestablishment, and release of a radio bearer. RRC signaling for various configurations is transmitted between the RRC layer of the IAB-MT of the IAB node 300-2 and the RRC layer of the donor gNB 200-1. With an RRC connection to the donor gNB 200-1, the IAB-MT is in an RRC connected mode. With no RRC connection to the donor gNB 200-1, the IAB-MT is in an RRC idle mode.

The NAS layer higher than the RRC layer performs session management, mobility management, and the like. NAS signaling is transmitted between the NAS layer of the IAB-MT of the IAB node 300-2 and the AMF 11 of the NAS layer.

Figure 7:
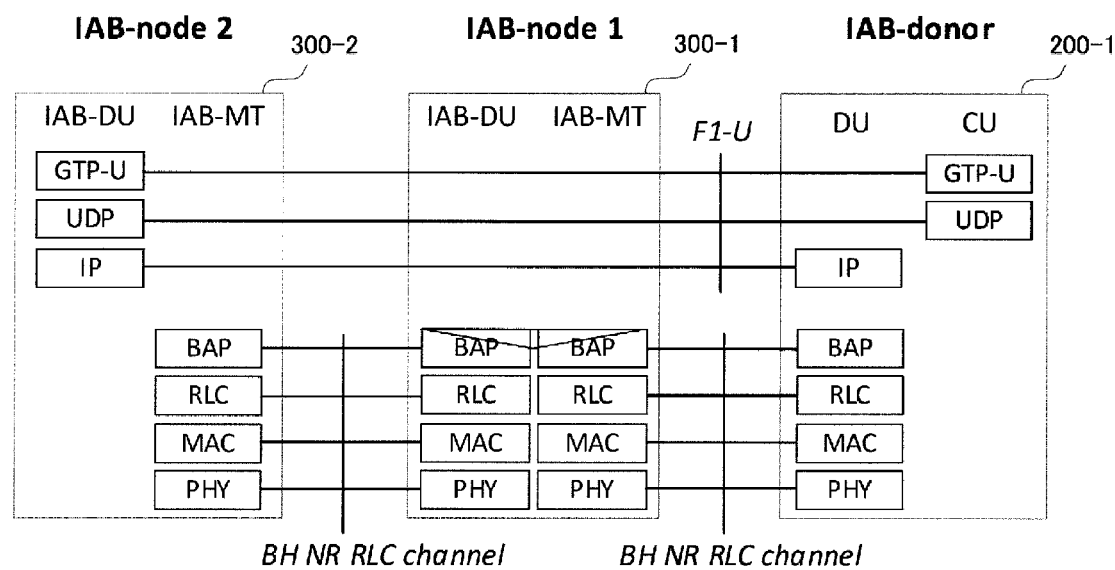
FIG. 7 is a diagram illustrating a protocol stack related to an F1-U protocol.
Figure 8:
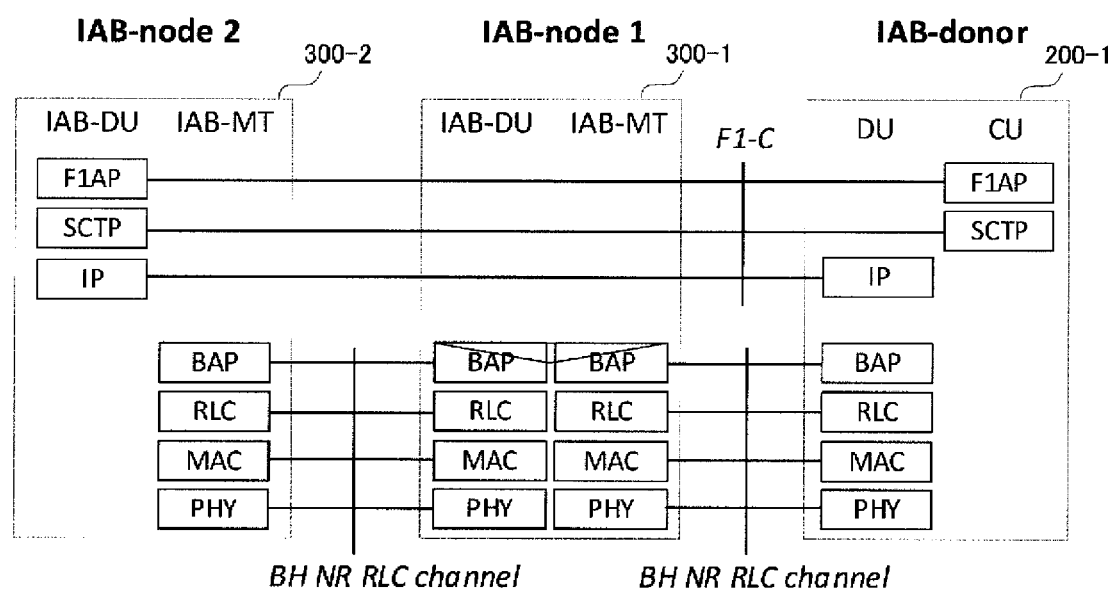
FIG. 8 is a diagram illustrating a protocol stack related to the F1-C protocol.

FIG. 7 is a diagram illustrating an example of a protocol stack for the F1-U protocol. FIG. 8 is a diagram illustrating an example of a protocol stack for the F1-C protocol. Here, an example in which the donor gNB 200-1 is divided into the CU and the DU is illustrated.

As illustrated in FIG. 7, each of the IAB-MT of the IAB node 300-2, the IAB-DU of the IAB node 300-1, the IAB-MT of the IAB node 300-1, and the DU of the donor gNB 200-1 includes a Backhaul Adaptation Protocol (BAP) layer as an upper layer of the RLC layer. The BAP layer is a layer that performs routing processing and bearer mapping and demapping processing. In the backhaul (BH), transmitting the IP layer via the BAP layer allows multi-hop routing.

In each BH link, Protocol Data Units (PDUs) of the BAP layer are transmitted by the backhaul RLC channel (BH NR RLC channel). Configuring multiple backhaul RLC channels in each BH link enables the prioritization and QoS control of traffic. The association between the BAP PDU and the backhaul RLC channel is performed by the BAP layer of each IAB node 300 and the BAP layer of the donor gNB 200-1.

As illustrated in FIG. 8, the protocol stack of the F1-C protocol includes an F1AP layer and an SCTP layer instead of a GTP-U layer and a UDP layer illustrated in FIG. 7.

Relay Node Support Information

Relay node support information (IAB support information) according to an embodiment will be described. A node managing a cell includes the IAB support information in system information block type 1 (SIB1) broadcast in the cell when the cell supports the IAB node 300.

The "node managing cell" refers to the gNB 200 (DU) or the IAB node 300 (IAB-DU). The "cell supports the IAB node 300" means that the cell includes a function of handling the IAB node 300, and is allowed to select the cell as a candidate cell for the IAB node 300.

SIB1 is an example of system information (system information block). SIB1 includes information that defines scheduling of other system information blocks and that is required for initial access. SIB1 is broadcast periodically on a downlink shared channel (DL-SCH).

Figure 9:
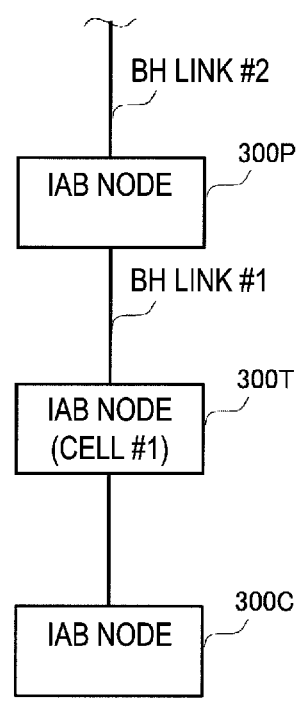
FIG. 9 is a diagram illustrating operations related to IAB support information according to an embodiment.

FIG. 9 is a diagram illustrating operations related to the IAB support information according to an embodiment. Here, the operation of the IAB node 300T will be mainly described. The parent node of the IAB node 300T is the IAB node 300P, and the child node of the IAB node 300T is the IAB node 300C.

As illustrated in FIG. 9, the IAB node 300T managing a cell #1 firstly broadcasts the IAB support information indicating that the cell #1 supports IAB node 300. Specifically, the IAB node 300 includes the IAB support information in SIB1 transmitted periodically in the cell #1.

Secondly, the IAB node 300T communicates a failure-related notification indicating that a failure has occurred in the BH link.

Here, "communicating a failure-related notification" may mean that the IAB node 300T transmits a Type ½ Notification indicating that a failure has occurred in a BH link #1 between the IAB node 300P and the IAB node 300T. "Communicating a failure-related notification" may mean that the IAB node 300T receives, from the IAB node 300P, the Type ½ Notification indicating that a failure has occurred in the BH link #2 of the IAB node 300P.

The failure-related notification may be a notification indicating that the BH RLF, which is a radio link failure of the BH link, has been detected. Such a failure-related notification is hereinafter referred to as a Type 1 Notification.

The failure-related notification may be a notification indicating that an attempt is being made to recover the BH link (i.e., recover from the BH RLF). Such a failure-related notification is hereinafter referred to as a Type 2 Notification. The Type 1 Notification and the Type 2 Notification are referred to as Type ½ Notifications when the Type 1 Notification and the Type 2 Notification are not distinguished from each other.

The Type ½ Notification may be included in a message of the BAP layer, for example, a BAP Control Protocol Data Unit (PDU). The IAB node 300C connected to the IAB node 300T can receive, from the IAB node 300T, the Type ½ Notification included in the message of the BAP layer. However, the IAB node 300 (IAB-MT) which is not connected to the IAB node 300T and is in the idle state, is unable to receive the message of the BAP layer.

Thirdly, the IAB node 300T stops broadcasting the IAB support information based on the communication of the Type ½ Notification.

When the communication of the Type ½ Notification occurs, that is, when a BH RLF occurs, the IAB node 300T has difficulty in providing services to the child node. Accordingly, when the broadcast of the IAB support information is stopped, the IAB node 300 (IAB-MT) in the idle state is barred from selecting the cell #1 of the IAB node 300T as a candidate cell in which the IAB node 300 (IAB-MT) exists. This causes the IAB node 300 (IAB-MT) in the idle state to not be allowed to select the IAB node 300T unable to provide services.

The IAB node 300C which is a child node connected to the IAB node 300T may maintain a state of being connected to the IAB node 300T even when the broadcast of the IAB support information is stopped. This allows the IAB node 300C to wait for recovery of the BH link for a predetermined period of time.

Figure 10:
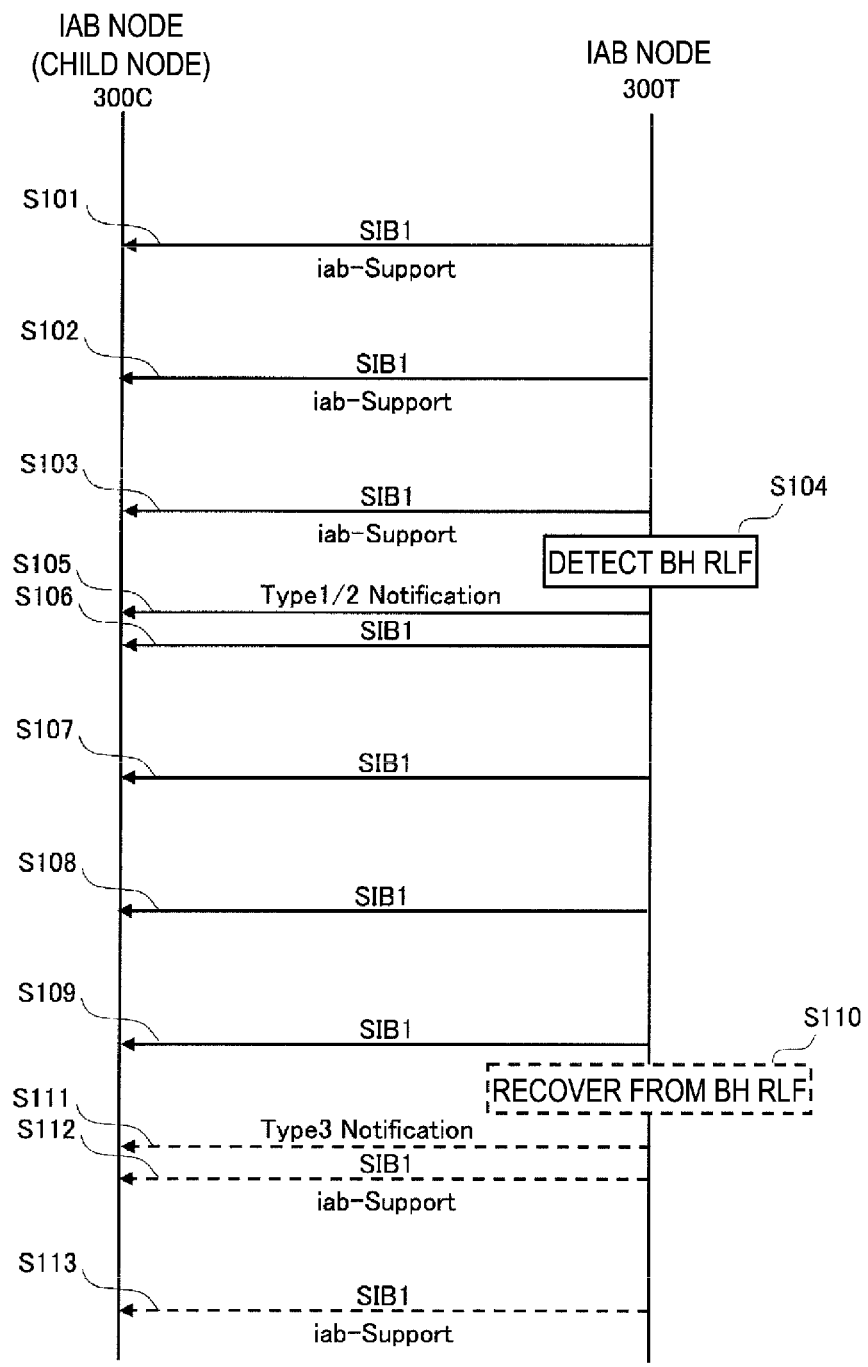
FIG. 10 is a diagram illustrating Operation Example 1 according to an embodiment.

FIG. 10 is a diagram illustrating Operation Example 1 according to an embodiment. In the drawings of Operation Examples 1 to 4 described below, steps that are optional are indicated by dashed lines.

As illustrated in FIG. 10, in steps S101 to S103, the IAB-DU of the IAB node 300T periodically broadcasts SIB1 including the IAB support information (iab-Support).

In step S104, the IAB-MT of the IAB node 300T detects a BH RLF at the IAB node 300T.

In step S105, the BAP layer of the IAB node 300T transmits, to the IAB node 300C, a BAP Control PDU including the Type ½ Notification in response to the detection of the BH RLF at the IAB node 300T.

In steps S106 to S109, the IAB-DU of the IAB node 300T periodically broadcasts SIB1 including no IAB support information (iab-Support), in response to the transmission of the BAP Control PDU including the Type ½ Notification (or in response to the detection of the BH RLF in step S104). That is, the IAB-DU of the IAB node 300T removes the IAB support information (iab-Support) from SIB1.

In step S110, the IAB-MT of the IAB node 300T recovers from the BH RLF. For example, the IAB-MT of the IAB node 300T succeeds in RRC reestablishment processing and maintains the RRC connected state.

In step S111, the BAP layer of the IAB node 300T transmits, to the IAB node 300C, a BAP Control PDU including a Type 3 Notification (RLF recovered) in response to the recovery from the BH RLF. The Type 3 Notification is a notification indicating the recovery from the BH RLF.

In steps S112 and S113, the IAB-DU of the IAB node 300T periodically broadcasts SIB1 including the IAB support information (iab-Support), in response to the transmission of the BAP Control PDU including the Type 3 Notification (or in response to the recovery from the BH RLF in step S110).

Figure 11:
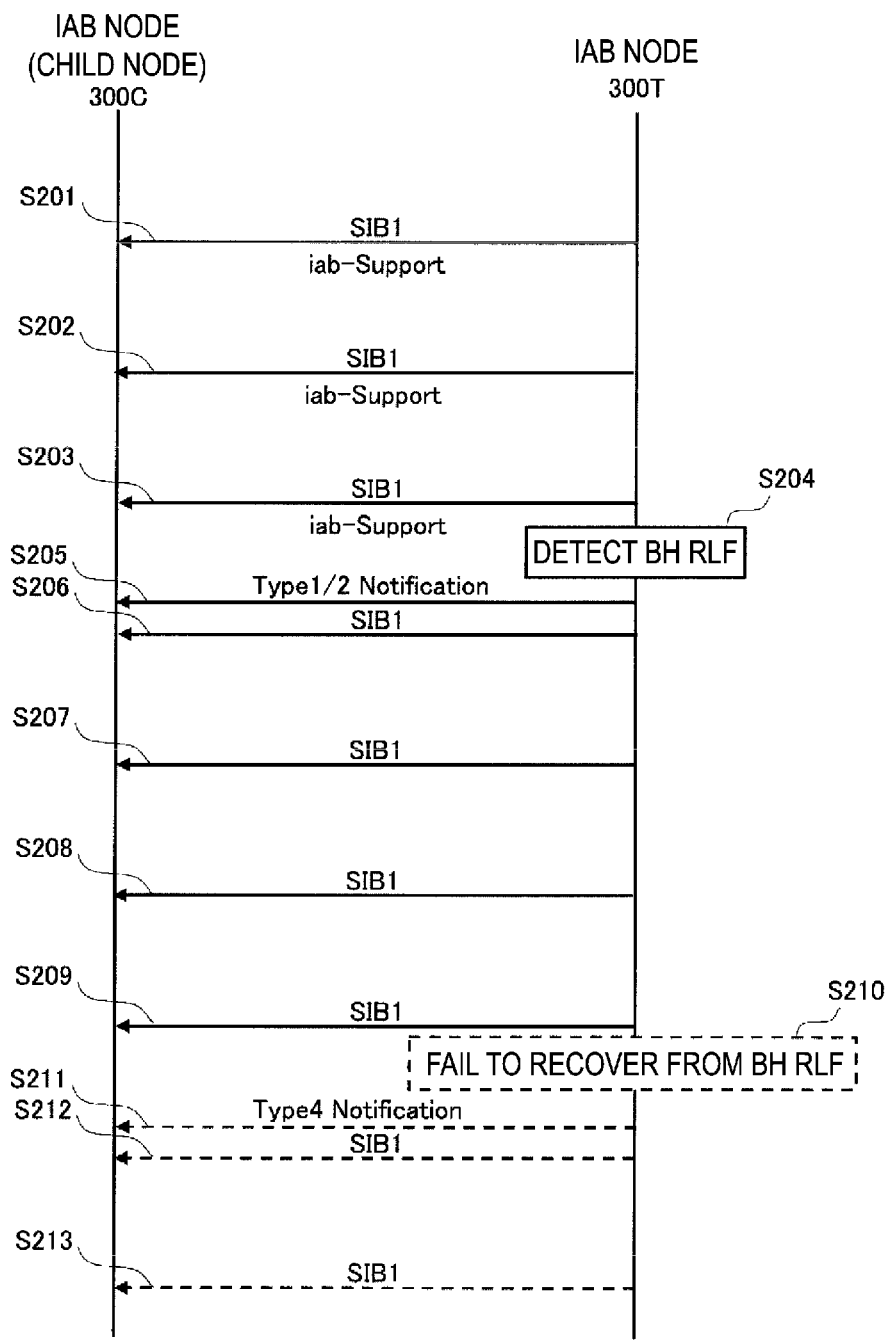
FIG. 11 is a diagram illustrating Operation Example 2 according to an embodiment.

FIG. 11 is a diagram illustrating Operation Example 2 according to an embodiment. Here, description focuses on differences from Operation Example 1 described above.

As illustrated in FIG. 11, operations in steps S201 to S209 are the same as, and/or similar to, the operations in Operation Example 1 described above.

In step S210, the IAB-MT of the IAB node 300T fails to recover from the BH RLF. For example, the IAB-MT of the IAB node 300T fails in RRC reestablishment processing, and transitions to the RRC idle state.

In step S211, the BAP layer of the IAB node 300T transmits, to the IAB node 300C, a BAP Control PDU including a Type 4 Notification (Recovery failure) in response to the failure to recover from the BH RLF. The Type 4 Notification is a notification indicating the failure to recover from the BH RLF.

In steps S212 and S213, the IAB-DU of the IAB node 300T periodically broadcasts SIB1 including no IAB support information (iab-Support), in response to the transmission of the BAP Control PDU including the Type 4 Notification (or in response to the failure to recover from the BH RLF in step S210).

Figure 12:
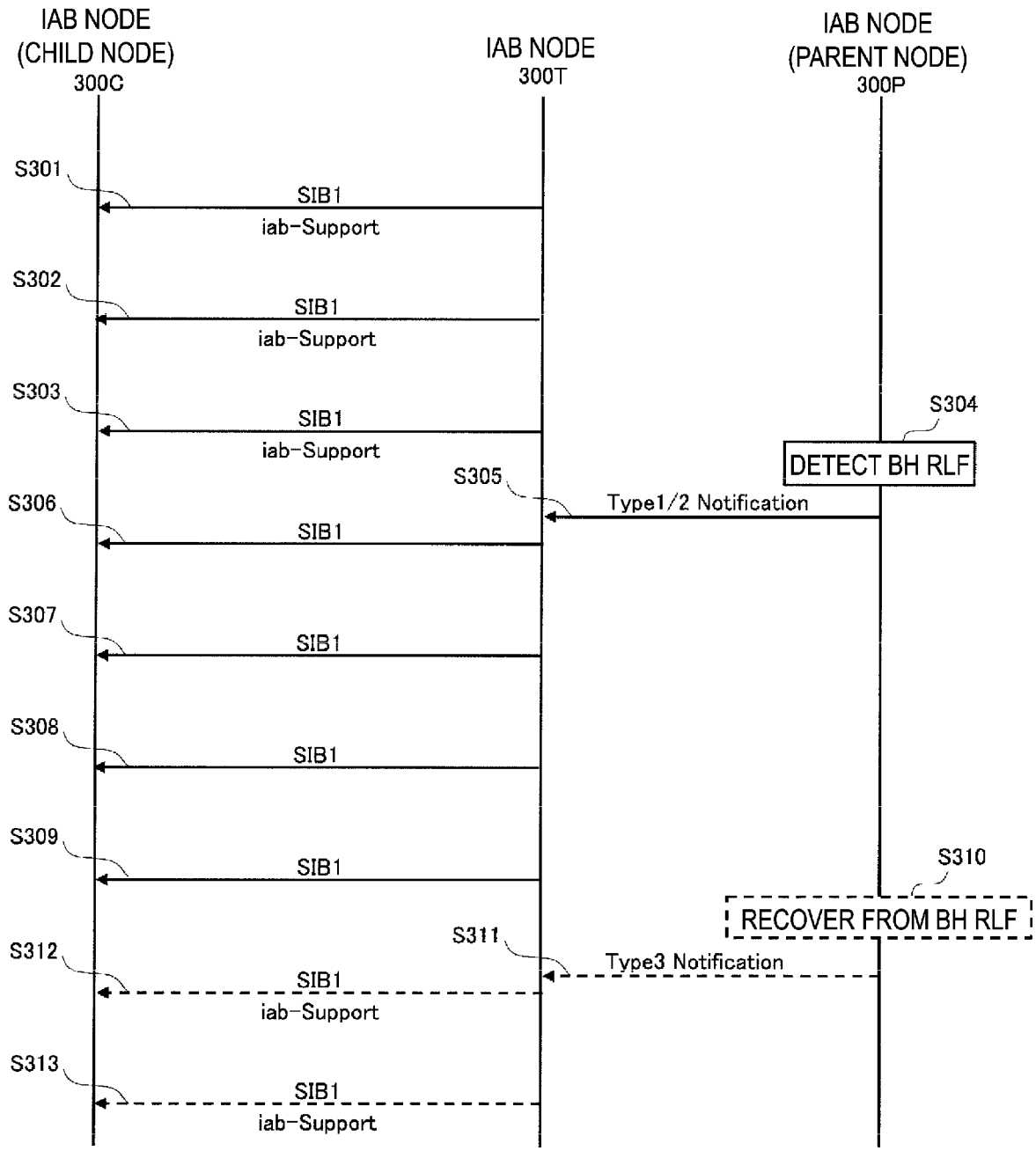
FIG. 12 is a diagram illustrating Operation Example 3 according to an embodiment.

FIG. 12 is a diagram illustrating Operation Example 3 according to an embodiment. Here, description focuses on differences from Operation Examples 1 and 2 described above.

As illustrated in FIG. 12, in steps S301 to S303, the IAB-DU of the IAB node 300T periodically broadcasts SIB1 including the IAB support information (iab-Support).

In step S304, the IAB-MT of the IAB node 300P corresponding to a parent node detects a BH RLF at the IAB node 300P.

In step S305, the BAP layer of the IAB node 300P transmits, to the IAB node 300T, a BAP Control PDU including the Type ½ Notification in response to the detection of the BH RLF at the IAB node 300P.

In steps S306 to S309, the IAB-DU of the IAB node 300T periodically broadcast SIB1 including no IAB support information (iab-Support) in response to the reception of the BAP Control PDU including the Type ½ Notification. That is, the IAB-DU of the IAB node 300T removes the IAB support information (iab-Support) from SIB1.

In step S310, the IAB-MT of the IAB node 300P recovers from the BH RLF.

In step S311, the BAP layer of the IAB node 300P transmits, to the IAB node 300T, a BAP Control PDU including the Type 3 Notification (RLF recovered) in response to the recovery from the BH RLF.

In steps S312 and S313, the IAB-DU of the IAB node 300T periodically broadcasts the SIB1 including the IAB support information (iab-Support) in response to the reception of the BAP Control PDU including the Type 3 Notification.

Figure 13:
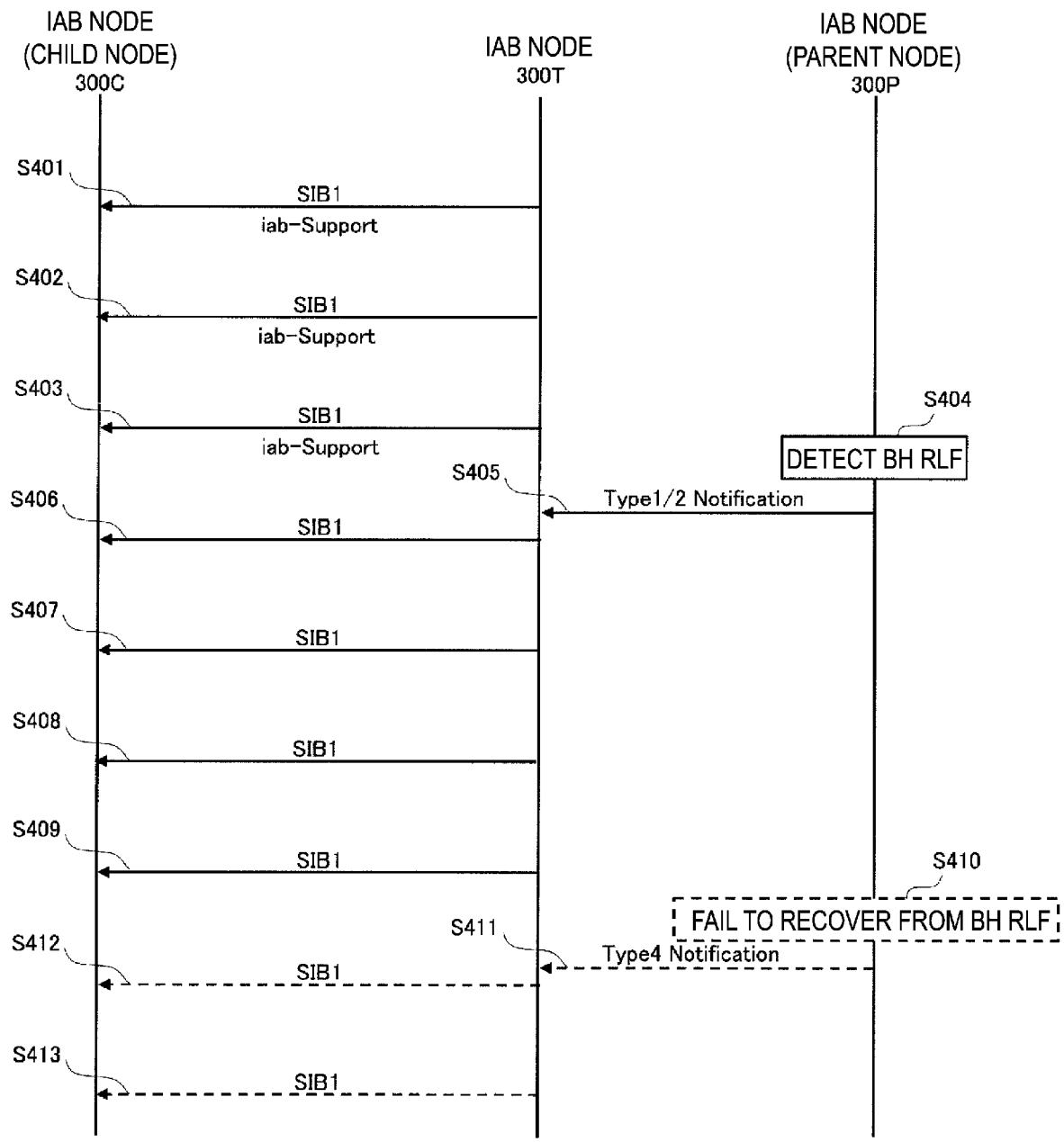
FIG. 13 is a diagram illustrating Operation Example 4 according to an embodiment.

FIG. 13 is a diagram illustrating Operation Example 4 according to an embodiment. Here, description focuses on differences from Operation Examples 1 to 3 described above.

As illustrated in FIG. 13, operations in steps S401 to S409 are the same as, and/or similar to, the operations in Operation Example 3 described above.

In step S410, the IAB-MT of the IAB node 300P fails to recover from the BH RLF.

In step S411, the BAP layer of the IAB node 300P transmits, to the IAB node 300T, a BAP Control PDU including the Type 4 Notification (Recovery failure) in response to the failure to recover from the BH RLF.

In steps S412 and S413, the IAB-DU of the IAB node 300T periodically broadcast SIB1 including no IAB support information (iab-Support) in response to the reception of the BAP Control PDU including the Type 4 Notification.

Exclusion Request Period

An exclusion request period according to an embodiment will be described.

In selecting (including reselecting) candidate cells which the IAB node 300 is to exist in (camp on), the IAB-MT of the IAB node 300 excludes, over a predetermined period of time, a cell not broadcasting the IAB support information from the candidate cells. The predetermined period of time during which the continuation of such exclusion is requested is referred to as the exclusion request period. The exclusion request period is, for example, approximately 300 seconds.

That is, the IAB-MT of the IAB node 300 considers the cell not broadcasting the IAB support information as a cell barred from being selected as a candidate cell, and avoids selecting the cell as a candidate cell over the exclusion request period.

However, as described above, after the broadcast of the IAB support information is stopped, the broadcast of the IAB support information may be resumed. In such a case, the constraint of the exclusion request period may make it difficult for the IAB-MT of the IAB node 300 to select a cell with an optimal radio state as a candidate cell. Thus, when the broadcast of the IAB support information is resumed, the constraint of the exclusion request period is desirably removed.

Figure 14:
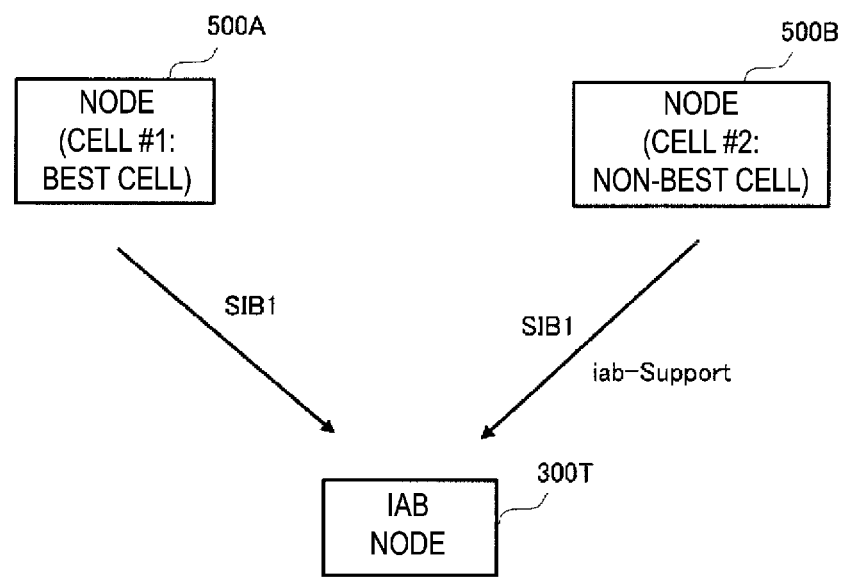
FIG. 14 is a diagram illustrating operations related to an exclusion request period according to an embodiment.

FIG. 14 is a diagram illustrating operations related to the exclusion request period according to an embodiment.

As illustrated in FIG. 14, a node 500A managing the cell #1 and a node 500B managing a cell #2 exist. The node 500A is the gNB 200 or the IAB node 300, and the node 500B is the gNB 200 or the IAB node 300.

The cell #1 is a cell providing the best radio state for the IAB node 300T (hereinafter referred to as the "best cell"). For example, the received power of a reference signal received at the IAB node 300T from the cell #1 (node 500A) is large. In the example illustrated in FIG. 14, the cell #1 (node 500A) transmits SIB1 including no IAB support information (iab-Support).

The cell #2 is not the best cell for the IAB node 300T (the cell #2 is hereinafter referred to as the "non-best cell"). For example, the received power of a reference signal received at the IAB node 300T from the cell #2 (node 500B) is small. In the example illustrated in FIG. 14, the cell #2 (node 500B) transmits SIB1 including IAB support information (iab-Support).

In such a situation, the IAB-MT of the IAB node 300T excludes, from the candidate cells in which the IAB node 300T is to exist, the cell #1 not broadcasting the IAB support information (iab-Support) indicating that the IAB node 300 is supported. As a result, the IAB-MT of the IAB node 300T may select the cell #2 broadcasting the IAB support information (iab-Support) indicating that the IAB node 300 is supported, as a candidate cell in which the IAB node 300T is to exist. However, the cell #2 is not the best cell. Here, the description assumes that the IAB-MT of the IAB node 300T has selected the cell #2.

Even during the exclusion request period in which the continuation of the exclusion is requested, the IAB-MT of the IAB node 300T selects the cell #1 as a candidate cell when the broadcast of the IAB support information (iab-Support) from the cell #1 has been confirmed. For example, when the cell #1 (node 500A) resumes the broadcast of the IAB support information (iab-Support) after stopping the broadcast of the IAB support information (iab-Support), the IAB-MT of IAB node 300T selects the cell #1 as a candidate cell. This allows the IAB-MT of the IAB node 300T to smoothly select the best cell.

When the IAB-MT of the IAB node 300T is in the RRC idle state, the IAB-MT of the IAB node 300T may periodically check whether the IAB support information has been broadcast from the cell #1 during the exclusion request period after excluding the cell #1 not broadcasting the IAB support information (iab-Support).

For example, in a state where the IAB-MT of the IAB node 300T in the RRC idle state has selected the cell #2, the IAB-MT of the IAB node 300T may periodically check whether the IAB support information has been broadcast from the cell #1. Upon confirming that the IAB support information (iab-Support) has been broadcast from the cell #1, the IAB-MT of the IAB node 300T in the RRC idle state includes the cell #1 in the candidate cells. This allows the cell re-selection from the cell #2 to the cell #1 to be smoothly performed.

On the other hand, when the IAB-MT of the IAB node 300T is in the RRC connected state, the IAB-MT of the IAB node 300T may consider that the constraint of the exclusion request period after the exclusion of the cell #1 not broadcasting the IAB support information (iab-Support) is not applied to the IAB node 300 T (IAB-MT). That is, the exclusion request period becomes invalid when the IAB-MT of the IAB node 300T transitions to the RRC connected state.

For example, it is assumed that the IAB-MT of the IAB node 300T in the RRC connected state detects a BH RLF with the node 500A (cell #1), and while maintaining the RRC connected state, the IAB-MT of the IAB node 300T reestablishes an RRC connection with the node 500B (cell #2). In such a case, the IAB-MT of the IAB node 300T in the RRC connected state checks whether the IAB support information is broadcast from the cell #1 in a cell re-selection operation after detecting the BH RLF with the node 500B (cell #2). Upon confirming that the IAB support information (iab-Support) has been broadcast from the cell #1, the IAB-MT of the IAB node 300T in the RRC connected state includes the cell #1 in the candidate cells. This allows the RRC reestablishment from the connection with the cell #2 to the connection with the cell #1 to be smoothly performed.

Topology Number

Figure 15:
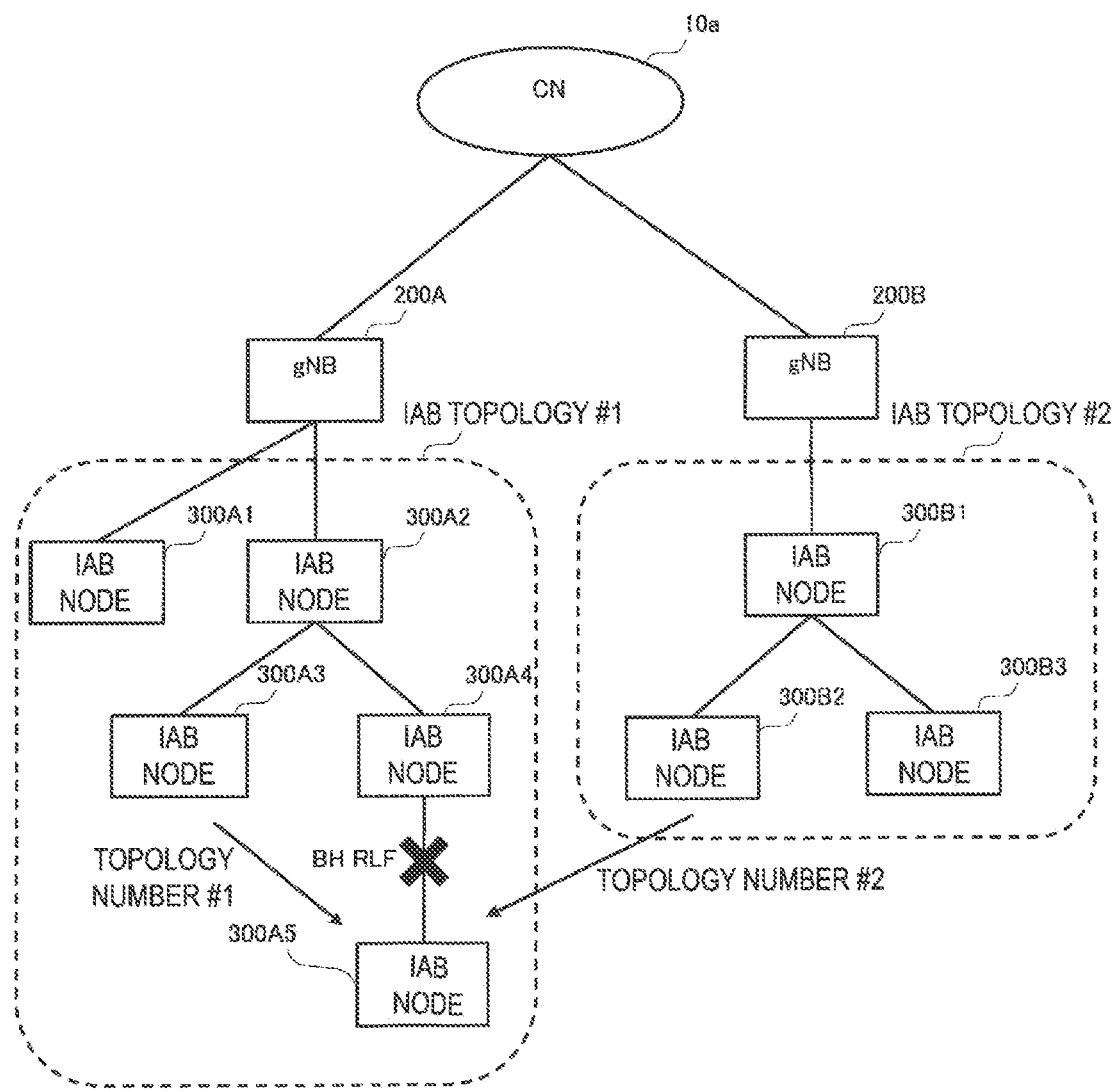
FIG. 15 is a diagram illustrating operations related to a topology number according to an embodiment.

A topology number according to an embodiment will be described. FIG. 15 is a diagram illustrating operations related to a topology number according to an embodiment.

As illustrated in FIG. 15, IAB nodes 300A1 to 300A5 exist under the gNB 200A corresponding to an IAB donor, and the IAB nodes 300A1 to 300A5 constitute an IAB topology #1. IAB nodes 300B1 to 300B3 exist under the gNB 200B corresponding to another IAB donor, and the IAB nodes 300B 1 to 300B3 constitute an IAB topology #2. The IAB topology is an example of a relay node topology. The IAB topology is a topology including one or more relay nodes managed by one donor node (donor gNB).

When the IAB-MT of the IAB node 300 belonging to one IAB topology performs cell re-selection or RRC reestablishment in another IAB topology, the IAB donor (specifically, the CU) is changed, and thus processing such as reconfiguration of the F1 interface is complicated. Accordingly, in the cell re-selection or RRC reestablishment, the IAB-MT of the IAB node 300 desirably selects the IAB node 300 under the same IAB donor (that is, the IAB node 300 within the same IAB topology).

For example, it is assumed that the IAB-MT of IAB node 300A5 belonging to IAB topology #1 detects a BH RLF with IAB node 300A4 corresponding to a parent node of IAB node 300A5. It is further assumed that the IAB-MT of the IAB node 300A5 can receive the IAB support information from the cell of the IAB node 300A3 belonging to the IAB topology #1 and the IAB support information from the cell of the IAB node 300B2 belonging to the IAB topology #2. Under such assumptions, the IAB-MT of the IAB node 300A5 may select any of the cell of the IAB node 300A5 and the cell of the IAB node 300B2 as a candidate cell.

In an embodiment, the cell of each IAB node 300 belonging to the IAB topology broadcasts a topology number identifying the IAB topology. For example, the IAB-DU of each IAB node 300 includes, in periodically broadcast SIB1, the topology number of the IAB topology to which the IAB node 300 belongs. In FIG. 15, the topology number of the IAB topology #1 is a topology number #1, and the topology number of the IAB topology #2 is a topology number #2.

Firstly, the IAB-MT of the IAB node 300A5 stores the topology number #1 broadcast from IAB node 300A4 when connecting to the IAB node 300A4. In other words, the IAB-MT of the IAB node 300A5 stores the topology number #1 of the IAB topology #1 which the IAB node 300A5 has joined.

Secondly, the IAB-MT of the IAB node 300A5 is assumed to detect a BH RLF with the IAB node 300A4. After detecting the BH RLF, the IAB-MT of the IAB node 300A5 selects a cell with which RRC reestablishment is to be processed by performing the cell re-selection. Here, the IAB-MT of the IAB node 300A5 preferentially selects, as an RRC reestablishment destination, a cell broadcasting the same topology number as the stored topology number #1 (the cell of the IAB node 300A3 in the example of FIG. 15). The IAB-MT of the IAB node 300A5 may exclude a cell (the cell of the IAB node 300B2 in the example of FIG. 15) broadcasting the topology number #2, which is different from the stored topology number #1, as a candidate for an RRC reestablishment destination (candidate cell).

As described above, broadcasting the topology number from the cell of each IAB node 300 belonging to the IAB topology allows an appropriate candidate cell to be selected in the RRC re-establishment processing.

Here, the topology number can be implemented with a smaller bit length than the ID of the IAB donor (CU). In particular, when the ID of the IAB donor (CU) is a global ID, the ID has a large bit length, increasing an overhead. In contrast, any topology number may be used unless the topology number overlaps between adjacent IAB topologies, and the topology number may overlap between geographically distant IAB topologies. This causes the required bit length of the topology number, to be smaller, decreasing an overhead.

For example, the topology number is configured for each IAB donor (CU) and/or each IAB-DU by a core network (CN) 10a or Operation, Administration, Maintenance (OAM). The topology number may be configurable for the IAB-DU on the F1 interface by the IAB donor (CU).

Other Embodiments

In the above-described embodiment, the RRC idle state may be interpreted as an RRC inactive state. The RRC inactive state refers to a state in which the RRC connection is suspended. Cell selection control (cell re-selection control) which is the same as, and/or similar to cell selection control applied to the RRC idle state can be applied to the RRC inactive state.

In the embodiments and variations described above, an example has been mainly described, in which the cellular communication system 1 is a 5G cellular communication system. However, the base station in the cellular communication system 1 may be an eNB that is an LTE base station. The core network in the cellular communication system 1 may be an Evolved Packet Core (EPC). The gNB can be connected to the EPC, the eNB can be connected to the 5GC, and the gNB and the eNB may be connected via an inter-base station interface (Xn interface, X2 interface).

A program may be provided that causes a computer to execute each of the processing operations according to the embodiments and the variations described above. The program may be recorded in a computer-readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like. A chip set may be provided that includes a memory that stores a program for executing each of the processing operations performed by the UE 100, the gNB 200, or the IAB node 300 and a processor that executes the program stored in the memory.

The invention claimed is:

1. A communication control method comprising:
  excluding, by a relay node, a cell not broadcasting relay node support information indicating that the relay node is supported, from candidate cells in which the relay node is to exist; and
  even during an exclusion request period in which continuation of the exclusion is requested, selecting, by the relay node, the cell as the candidate cell when the broadcasting of the relay node support information from the cell has been confirmed.

2. The communication control method according to claim 1, further comprising:
when the relay node is in an idle state, periodically checking, by the relay node, during the exclusion request period, whether the relay node support information has been broadcast from the cell.

3. The communication control method according to claim 1, further comprising:
when the relay node is in a connected state, considering, by the relay node, that a constraint of the exclusion request period is not applied to the relay node.

4. A communication control method comprising:
broadcasting, from a cell of a relay node belonging to a relay node topology, a topology number identifying the relay node topology, wherein the relay node topology is a topology including one or more relay nodes managed by one donor node;
storing, by a target relay node belonging to the relay node topology, the topology number; and
performing, by the target relay node, reestablishment processing in response to detecting a failure in a backhaul link, wherein
the performing the reestablishment processing comprises selecting, as a reestablishment destination, a cell broadcasting a topology number identical to the topology number stored.

5. A relay node in a communication system, the relay node comprising:
a controller circuitry configured to exclude a cell not broadcasting relay node support information indicating that the relay node is supported, from candidate cells in which the relay node is to exist; wherein
the controller circuitry is configured to select, even during an exclusion request period in which continuation of the exclusion is requested, the cell as the candidate cell when the broadcasting of the relay node support information from the cell has been confirmed.

* * * * *